J. F. HAUQUITZ.
SHIM.
APPLICATION FILED JUNE 28, 1911.
1,033,397.
Patented July 23, 1912.
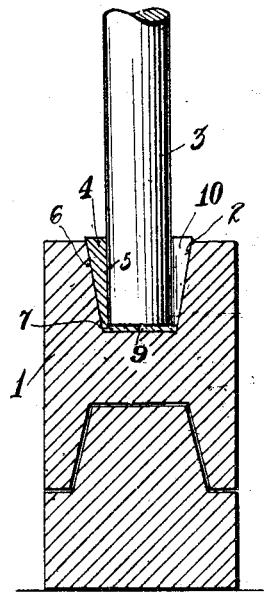
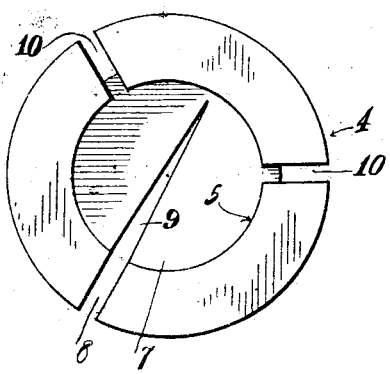
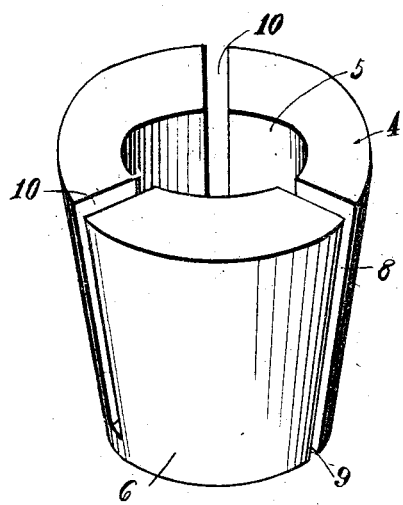
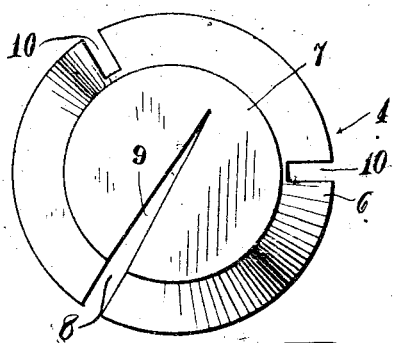
Witnesses
H. C. Fielding
H. K. Parsons
Inventor
John F. Hauquitz
By Harry Ellis Chandlee
Attorney

UNITED STATES PATENT OFFICE.

JOHN F. HAUQUITZ, OF IDAHO SPRINGS, COLORADO.

SHIM.

1,033,397.

Specification of Letters Patent.

Patented July 23, 1912.

Application filed June 28, 1911. Serial No. 635,721.

*To all whom it may concern:*

Be it known that I, JOHN F. HAUQUITZ, a citizen of the United States, residing at Idaho Springs, in the county of Clear Creek and State of Colorado, have invented certain new and useful Improvements in Shims, of which the following is a specification.

My invention relates to improvements in shims and has for its leading object the provision of an improved device of this character by the use of which a cylindrical shaft such as the shaft of a crusher stamp stem may be readily secured and wedged into place within a socket having a tapering wall.

A further object of my invention is the provision of a device by the use of which a cylindrical member may be caused to fit tightly into an inwardly tapering socket and be securely held in said socket without necessitating the changing of the size or shape of the shaft or stem in any manner, the object also being the provision of a device by the use of which jars or shocks against the free end of the shaft or stem to be secured in position will serve to tighten the grip of the retaining and adapting wedge instead of loosening the same as is the case when ordinary wedges are employed.

Other objects and advantages of my improved shim will be readily understood by reference to the following description taken in connection with the accompanying drawings, and it will be further understood that I may make any modifications in the specific structure shown and described within the scope of my claim without departing from or exceeding the spirit of my invention.

Figure 1 represents a sectional view showing my device in use in securing a stamp stem within a boss head. Fig. 2 represents a top plan view of my device. Fig. 3 represents a bottom plan view thereof. Fig. 4 represents a perspective view of the same.

In the drawings, the numeral 1 designates a boss head or member provided with the inwardly tapering socket 2 into which fits my improved device for securing the cylindrical shaft 3 in position within the socket 2.

My device as best shown in Fig. 4, comprises a substantially cylindrical sleeve 4 having the round bore 5 and having its outer face slightly or decidedly tapering toward one end, the inclination of the face 6 depending upon the tapering of the socket into which my device is adapted to fit. My device is closed at its smaller end by the end plate 7 formed integral therewith, while to permit of the diameter of the bore 5 being slightly varied in order that the shaft or stem 3 may be easily inserted and will be afterward clampingly retained by my device when the end of the shaft or stem on which my device is fitted is forced into the socket 2, I form in one side of the portion 4, the longitudinally extending slot 8 with its edges slightly spaced from each other, while I further form in the end or cap plate 7 the slot 9 which is a continuation of the slot 8 and extends across the cap plate diametrically almost to the opposite side of the sleeve 4 from that in which the slot 8 is formed. It will thus be seen that the slot 8 and the slot 9 together permit both of the size of the sleeve 4 at its open outer end and at its closed smaller inner end being varied to allow the same to be cammed or pressed into tight engagement with the cylindrical shaft or stem, while to further increase the resiliency of the portion 4 and enable it to be more readily sprung into clamping engagement with the stem, I form in said cylindrical portion at points equidistant from the slot 8 the slots 10, said slots 10, however, extending nearly to the base or end plate 7 and not cutting therethrough.

From the foregoing description taken in connection with the drawings the construction of my improved device will be readily understood, and it will be seen that the end of the stem 3 rests against the end plate 7 and serves to force the device into the socket 2, while the engagement of the internally tapered walls of the socket with the exteriorly tapered face 6 of my device serves to spring the slotted portions of my device against the stem to wedgingly lock the same within the socket.

I claim:

A shim, comprising a metal member having a cylindrical bore and having a tapering outer face, and an integrally formed end plate forming a closure for the smaller end of the device, said device having a plurality of longitudinally extending slots formed therein and having one of said slots continued and extending diametrically almost across the end plate of the device.

In testimony whereof I affix my signature, in the presence of two witnesses.

JOHN F. HAUQUITZ.

Witnesses:
ARTHUR HAUQUITZ,
RICHARD GARTRELLE.